United States Patent
Sutler

(10) Patent No.: US 7,318,092 B2
(45) Date of Patent: Jan. 8, 2008

(54) METHOD AND APPARATUS FOR REMOTE DISCOVERY OF SOFTWARE APPLICATIONS IN A NETWORKED ENVIRONMENT

(75) Inventor: Michael Brandon Sutler, Bellport, NY (US)

(73) Assignee: Computer Associates Think, Inc., Islandia, NY (US)

(*) Notice: Subject to any disclaimer, the term of this patent is extended or adjusted under 35 U.S.C. 154(b) by 860 days.

(21) Appl. No.: 10/349,815

(22) Filed: Jan. 23, 2003

(65) Prior Publication Data

US 2005/0102383 A1 May 12, 2005

(51) Int. Cl.
*G06F 15/173* (2006.01)
*G06F 1/12* (2006.01)

(52) U.S. Cl. .................. 709/223; 709/226; 717/171

(58) Field of Classification Search ........ 709/223–224, 709/226; 717/100, 120–121, 168–178; 726/22; 714/38
See application file for complete search history.

(56) References Cited

U.S. PATENT DOCUMENTS

| | | | | |
|---|---|---|---|---|
| 5,133,065 A | * | 7/1992 | Cheffetz et al. ............... | 714/2 |
| 5,649,099 A | * | 7/1997 | Theimer et al. ............... | 726/4 |
| 5,745,766 A | * | 4/1998 | Bramnick et al. .......... | 717/177 |
| 6,574,729 B1 | * | 6/2003 | Fink et al. ...................... | 713/1 |
| 7,051,098 B2 | * | 5/2006 | Masters et al. ............. | 709/224 |
| 2004/0039921 A1 | * | 2/2004 | Chuang ...................... | 713/187 |
| 2004/0044996 A1 | * | 3/2004 | Atallah ....................... | 717/169 |

OTHER PUBLICATIONS

Seesoft-Tool for visualizing line oriented software statistics, Eick, S.C. et al., Software Engineering, IEEE transactions on vol. 18, Issue 11, Nov. 1992, pp. 957-968.*
Network Scanning Techniques, Understanding how it it done, OfirArkin, PublicCom Communication Solutions, 1999.*
Eick et al., "Seesoft—A Tool for Visualizing Line Oriented Software Statistics," *IEEE*. vol. 18, No. 11, pp. 957-968 plus IEEE Xplore cover page, Nov. 1992.
CA Press, "New Release of CA's Unicenter NSM Leverages SQL Server, Integrates with CA and Third-Party Solutions," 3 pages, Sep. 12, 2006.
Computer Associates International, Inc., "Computer Associates Unicenter TNG Asset Management Option 3.1 Provides Complete Server-to-PDA Inventory," 2 pages, Jan. 24, 2001.

* cited by examiner

*Primary Examiner*—Zarni Maung
(74) *Attorney, Agent, or Firm*—Baker Botts L.L.P.

(57) ABSTRACT

Tools (in the form of methods, apparatus and system) are provided for discovering software applications in a networked environment. A host machine in the networked environment is scanned for attributes that match one or more application fingerprints, in order to determine an identity of software applications on the machine.

28 Claims, 11 Drawing Sheets

FIG. 1
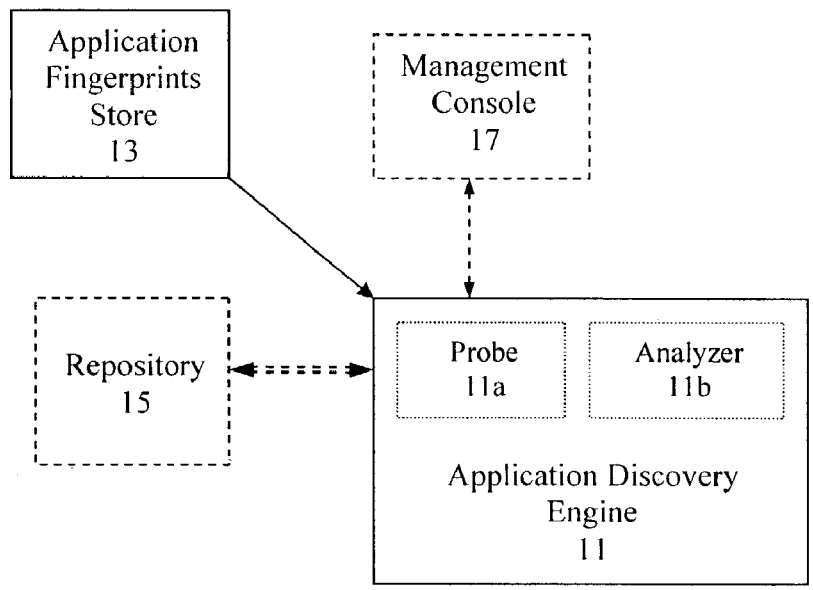
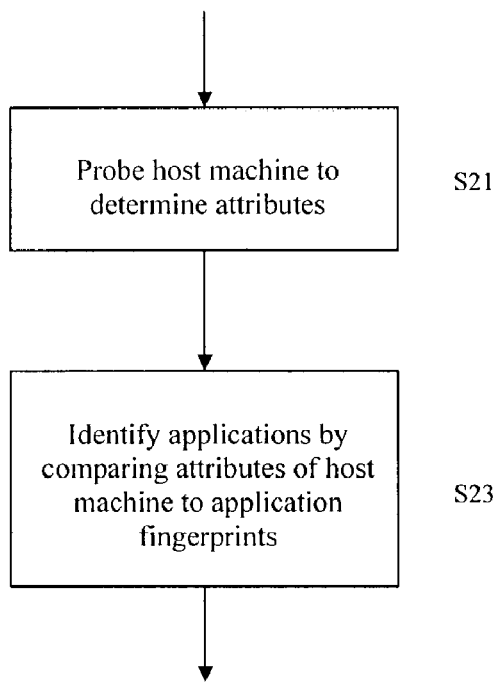
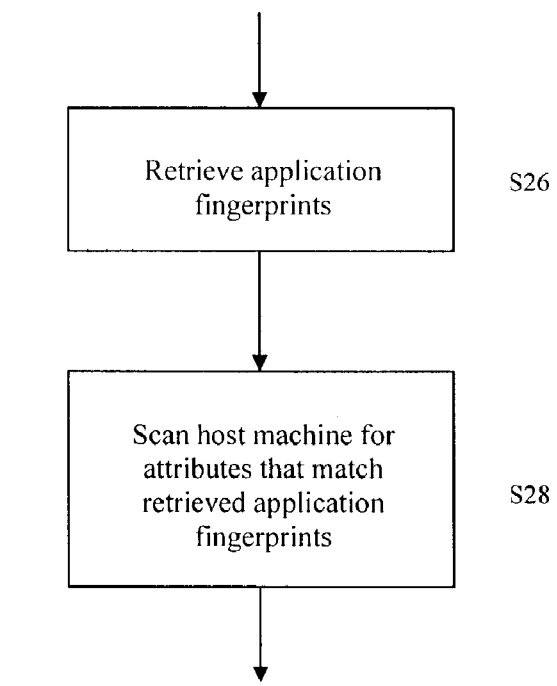
FIG. 2A                FIG. 2B

METHOD AND APPARATUS FOR REMOTE DISCOVERY OF SOFTWARE APPLICATIONS IN A NETWORKED ENVIRONMENT

TECHNICAL FIELD

This application relates to resource management in a networked environment. In particular, the application relates to remotely discovering application software in a networked environment.

DESCRIPTION OF RELATED ART

As use of computers and other information appliances proliferate in the current information age, increasing amounts of hardware and software are being purchased and deployed. In an enterprise context, as one might expect, there is growing pressure for accountability, i.e., where is the hardware and software going, are the hardware and software being utilized efficiently, etc.

For example, one exemplary part of enterprise management in which there is heightened sensitivity towards accountability is storage management. The accumulation of data and information has been accompanied by greater storage needs in an enterprise. One of the concerns regarding storage is whether the data stored on the storage devices is being managed properly to ensure data availability. Data availability requirements typically include ensuring that the data is available to the applications that need it, when they need it, and with quality of service requirements being met.

The significant storage-related expenditures of an enterprise make storage management a critical part of running the enterprise. One of the main reasons for high management costs is that managing storage (and ensuring data availability) requires a comprehensive and diverse set of tools, which is generally a management challenge. Conventional storage management tools typically have different strengths and weaknesses and often provide different views of the same information.

In addition, conventional storage management approaches, such as utilizing a collection of different tools, have proven cost ineffective. Costs associated with conventional management schemes may even be greater than the storage investment itself.

There is a growing need in the enterprise, both for purposes of storage management as well as for purposes of other areas of enterprise management, for an application discovery tool which permits remote discovery of software applications in a networked environment (such as may be present in the enterprise or elsewhere). Discovery of software applications may be useful for several reasons. For example, the ability to use the capabilities of other application software means that a computer program does not need to reproduce that functionality. An example is a portal program which uses an enterprise backup application to perform backup operations.

There exists discovery tools which can scan a network for attached hardware (for example, computers, switches, routers, etc.) in order to determine the nature of the network's topology. Using the hardware discovery tool, a user is able to remove the tedious and inherently inaccurate task of manually describing the network topology for enterprise management. However, conventional discovery tools discover hardware but not software, and must be explicitly told what a device on the network is in order to determine its use. None of these discovery tools probe a machine to determine software applications that are installed on the machine.

Enterprise management may be made more efficient through, and there is a need for, a facility which provides the user with a portal to software application tools and services within the networked environment for accomplishing the assorted enterprise management tasks.

SUMMARY

The present application provides a method for discovering software applications in a networked environment. In one embodiment, the method includes (a) retrieving one or more application fingerprints, and (b) scanning a host machine in the networked environment for attributes that match the retrieved application fingerprints, in order to determine an identity of software application on the host machine. The method, according to another embodiment, includes (a) probing a host machine in the networked environment to determine attributes of the machine, and (b) comparing the attributes of the host machine to one or more application fingerprints to determine an identity of software applications on the machine.

The application also provides an apparatus for discovering software applications in a networked environment having a plurality of host machines. In one embodiment, the apparatus includes an application discovery engine and an application fingerprints store for storing a plurality of application fingerprints. The application discovery engine includes means for probing a remote host machine in the networked environment to determine attributes of the machine, means for retrieving one or more of the application fingerprints from the application fingerprints store, and means for comparing the attributes of the remote machine to the retrieved application fingerprints to determine an identity of software application on the machine. The apparatus may optionally include a management console which provides a user with means to manage the discovered software applications.

The application also provides an apparatus for managing software applications in a networked environment. In one embodiment, the apparatus includes a host discovery component, an application discovery component, and a management console. The host discovery component scans the networked environment to identify host machines in the networked environment. The application discovery component probes each host machine identified by the host discovery component to determine attributes of the host machine, and compares the attributes of the host machine to application fingerprints to discover a software application deployed on the host machine. The management console includes means for managing the software applications discovered by the application discovery component in the networked environment.

The methods and apparatus of the present disclosure may be embodied in a program of instructions executable by a machine (such as a computer or computer system) which is stored in a storage medium or transmitted in one or more segments in a transmission medium.

BRIEF DESCRIPTION OF THE DRAWINGS

The features of the present application can be more readily understood from the following detailed description with reference to the accompanying drawings wherein:

FIG. 1 shows a block diagram of an apparatus, according to one embodiment, for discovering software applications in a networked environment;

FIG. 2A shows a flow chart of a method for discovering software applications in a networked environment, in accordance with one embodiment of the present application;

FIG. 2B shows a flow chart of a method, according to another embodiment, for discovering software applications in a networked environment;

DETAILED DESCRIPTION

Figure 3:
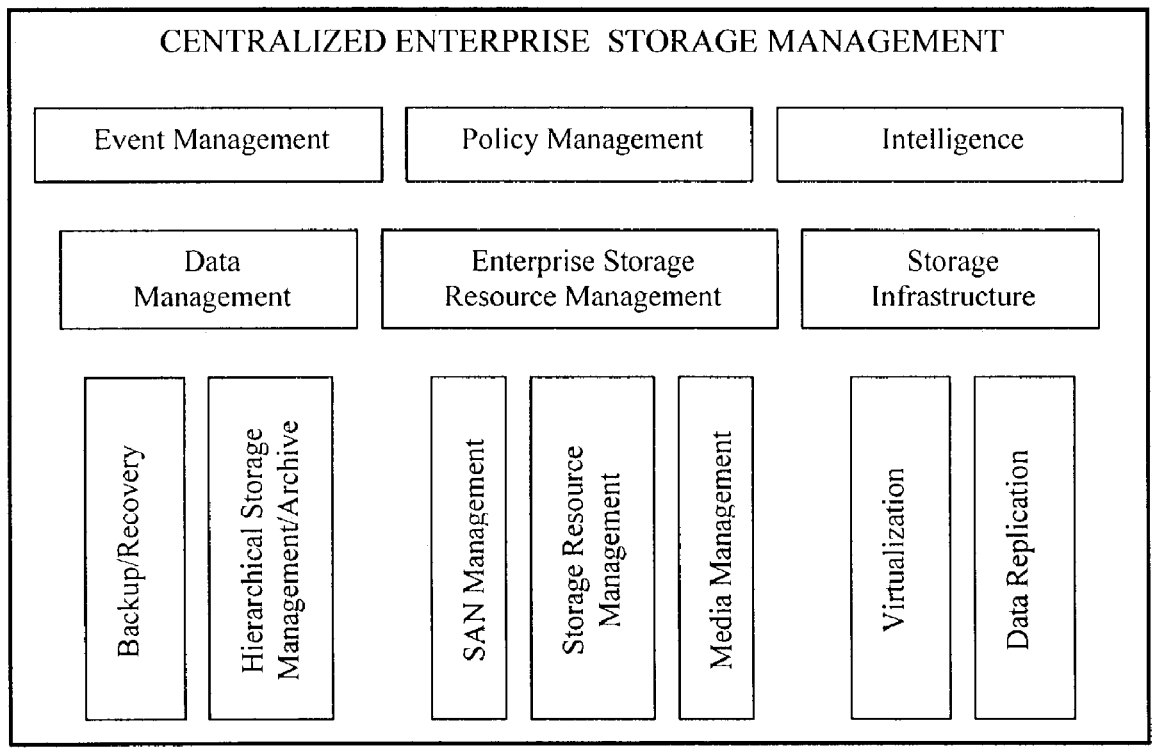
FIG. 3 shows a hierarchical view of categories of storage applications.

The present disclosure provides tools (in the form of methods, apparatus and systems) that help a user to discover software applications, which may be deployed remotely from the user, within a networked environment. Many software applications need to interface with other machines (i.e., other than the host on which the application is deployed) to perform their particular function. Therefore, applications, such as server type applications, typically produce certain detectable relics or side-effects which hint at the presence of the application on the host machine and can be recognized by another program. If the side-effects or relics produced by a software application are considered together, the combination typically forms a unique pattern. An "application fingerprint" (as the term is used herein) is a combination of the side-effects and relics of a software application which identifies the software application and which are evident as attributes of a host machine on which the application reside. Open ports, open URLs, SNMP Object Identifiers, open network shares, etc., are a few examples of such attributes.

The application discovery tools of this disclosure use application fingerprinting to infer the software applications which are deployed on a host.

According to one embodiment, an application discovery engine (ADE) is provided as a search tool for locating software applications remotely in a networked environment, based on the premise that software applications create an application fingerprint when installed. Processing in the ADE may begin, for example, by loading an application fingerprints file. Given a set of host machines to scan, the ADE scans each host for attributes which match application fingerprints in the application fingerprint file. For example, the ADE probes a host machine in the networked environment to determine attributes of the machine, and compares the attributes of the machine to the application fingerprints.

When the ADE finds that the attributes of the machine matches the application fingerprint of a software application, it infers that the application exists on the host. Thus, the ADE can (i) scan a host machine to determine all (or many) of the attributes of the host machine and match the attributes to the application fingerprints or (ii) scan a host for selected attributes identified by one or more of the application fingerprints.

The ADE may be an independent module which can be invoked as desired and/or needed, or a component of an enterprise management apparatus (described exemplarily below).

An apparatus 10 for discovering software applications in a networked environment, according to one embodiment (as shown in FIG. 1), may include an application discovery engine 11, an application fingerprints store 13, an optional repository 15 and an optional user interface 17.

The application fingerprints store 13 stores a plurality of application fingerprints. Application fingerprints may be specified through (and stored in) any of many possible formats. According to one embodiment, an application fingerprint may be specified in the form of a combination of tests, which are directed to the side effects, relics and/or other attributes of the corresponding application. If a host passes the tests of an application fingerprint, it is inferred that the corresponding application exists on the host.

For example, the tests may include an open port test which is used to check if a specified port is open on a machine. A protocol [for example, TCP (Transmission Control Protocol) and UDP (User Datagram Protocol)] and a port number may be specified, and if the specified port number is open according to the specified protocol for the current host, the test is passed.

A URL (Uniform Resource Locator) test may be used to check if a certain web page is available. For example, given a port number, URL path and return string, the page (or other resource) associated with the URL is retrieved, and if the return string is present on the page, the test is passed. A HTTPS test is similar to a URL test except HTTPS (a secured version of Hypertext Transfer Protocol) is used.

An executable test provides more flexibility for the user to extend the test capabilities of the ADE. For example, the user can provide any command line executable (for example, a script) that accepts a target host name as an argument. The ADE launches the executable, passing the host name as an argument of the executable. The user also provides a result string for testing whether the executable is successfully launched. If the string returned by the executable matches the result string, the test is passed.

A network share test may be used to find a specified network share on the target host. If the network share is available, the test is passed.

An object type test may be used to check the type of host which the target machine is. If it matches one of the classes in a specified list (as an argument of the test), the test is passed.

A registry test may be used to find a specified registry key and retrieve its value. If the retrieved value matches a specified test result, the test is passed.

A SAN (Storage Area Network) test runs a program to test for a SAN proxy tool.

A SNMP (Simple Network Management Brotocol) test performs a SNMP walk looking for a specified SNMP object identifier (OID). If the OID exists, the test is passed.

Other tests may be used to identify the presence of application software attributes.

Application fingerprints also may be specified by using, for example, an XML (Extensible Markup Language) grammar and saved in an application fingerprints file. The user may specify additional application fingerprints by using the XML grammar and add the additional application fingerprints to the application fingerprints file. The fields of an application fingerprint may include, for example, application name, description, version number, classification name, and one or more of the above described tests (or other forms of specify application attributes).

An application fingerprint also may be a data object, in which attributes of the corresponding software application are associated with fields of the data object. It should be understood that application fingerprints may be specified and stored in any of many possible format, in addition to the exemplary formats described herein. Therefore, the invention as claimed in the claims appended hereto should not be construed as limited to the application fingerprints formats described herein. For example, while the application fingerprints may be stored in a file, it should be understood that the application fingerprints store may be a database (or a portion thereof). In any event, each application fingerprint provides enough information for determining whether a corresponding application exists on a host machine.

The repository 15 (for example, a file, database, etc.) may be optionally provided to store data objects corresponding to (and/or identifying) known host machines in the networked environment, and data objects corresponding to known software application installations. The application discovery engine 11 selects target host machines by retrieving corresponding data objects from the repository 15.

The application discovery engine 11 includes probe 11a for probing a selected, remote host machine in the networked environment, and analyzer 11b for comparing the attributes of the remote machine to the retrieved application fingerprints. The application discovery engine 11 probes (or interrogates) the target host machine to determine attributes of the machine. The attributes are then compared to application fingerprints retrieved from the application fingerprints store 13. If the attributes of the target host machine match an application fingerprint, it is inferred that the corresponding software application is deployed or installed on the host machine.

The user interface 17 may optionally be provided, such as in the form of a management console for monitoring and/or managing selected ones of the identified software applications. The management console may include, for example, means for performing one or more of the following: launching selected ones of the software applications; monitoring selected ones of the software applications; defining a condition for triggering an alert on the management console, relating to a selected one of the software applications; initiating backup of files for selected ones of the software applications; querying a selected one of the software applications to determine when files for the software application were last backed up; and managing access rights for selected ones of the software applications. The apparatus may further comprise means for a user to define bounds for the networked environment (for example, host machines which are scanned for applications). The bounds of the networked environment may be defined by excluding selected host machines and/or by including other selected host machines.

A method for discovering software applications in a networked environment, according to one embodiment (FIG. 2A), may include (a) probing, with the probe 11a, a host machine remotely located in the networked environment to determine attributes of the machine (step S21), and (b) comparing, with the analyzer 11b, the attributes of the host machine to one or more application fingerprints to identify software applications which are deployed or installed on the machine (step S23). The software applications preferably are identified without user intervention. The method may be embodied in a program of instructions executable by a machine (such as a computer or computer system) which is stored in a storage medium or transmitted in one or more segments in a transmission medium.

The method, according to another embodiment (FIG. 2B), may include (a) retrieving one or more application fingerprints from the application fingerprints store 13 (step S26), and (b) scanning a host machine in the networked environment for attributes that match the retrieved application fingerprints, in order to determine an identity of software applications on the host machine through the application discovery engine 11 (step S28).

The method may further include performing one or more tests to determine the attributes of the host machine. The tests may include, for example, the following: determining whether a predetermined port on the host machine is open; determining whether a predetermined web page is available from the host machine; a SNMP (Simple Network Management Protocol) test; a URL (Uniform Resource Locator) test; an executable test; a network share test; an object type test; a registry test; and a SAN (Storage Area Network) test.

The method may further include providing a report listing a plurality of application software which are identified by comparing application fingerprints.

The method may also include providing a user interface. The user interface provides a user with means to select one of the identified software applications and means to launch the selected software application.

The method may further include probing the networked environment to identify a plurality of target host machines in the networked environment, probing each identified target host machine to determine attributes of the machine and comparing the attributes of the machine to the application fingerprints to identify software applications on the target host machine.

Some embodiments for centralized command and control of storage applications in a networked environment are described below to explain, by way of example, how the enterprise resource management tools of the subject application may be applied to one of many enterprise management tasks. It should be appreciated, however, that the application discovery tools disclosed in this application and claimed in the claims appended hereto are not limited to the storage management embodiments described herein. The appended claims cover application discovery for storage management as well as for other areas of enterprise resource management (such as, for example, communication, data analysis, etc.).

Enterprise management tools and services may be provided through, according to one embodiment, a single portal (described below) to facilitate efficient management.

The portal provides the storage administrator with a management console to view, implement, report on, analyze, monitor, and automate storage management procedures. An administrator can perform one or more of the following through the management console: view the status of devices, backups and performance; view events related to storage consumption; manage backup jobs, including monitoring their current progress, accessing policy definitions, etc.; monitor utilization, for example, presented in the form of measurements, such as percentage full by volume, or organized by application; monitor the types of assets being consumed, the class of service attributes of those assets, etc.; manage storage area networks; and discover and manage devices and applications.

The portal presents in a common view the storage and storage related applications available in the networked environment. The management console may comprise a set of GUIs (graphic user interface, also referred to herein as one or more "portlets") for interacting with the storage devices and applications. The commonality of user interface and interaction enables the storage administrator to manage more storage with fewer resources.

A centralized storage management tool provides a facility through which a storage administrator can perform the tasks associated with storage management. A networked environment may potentially have hundreds of independent storage applications (as shown hierarchically in FIG. 3) in which a storage administrator or another user may have an interest. An integrated application discovery component provides the means for discovering storage applications deployed in the networked environment. Application discovery locates the applications preferably autonomously, performing as much of the probing as possible, without user intervention.

Figure 4:
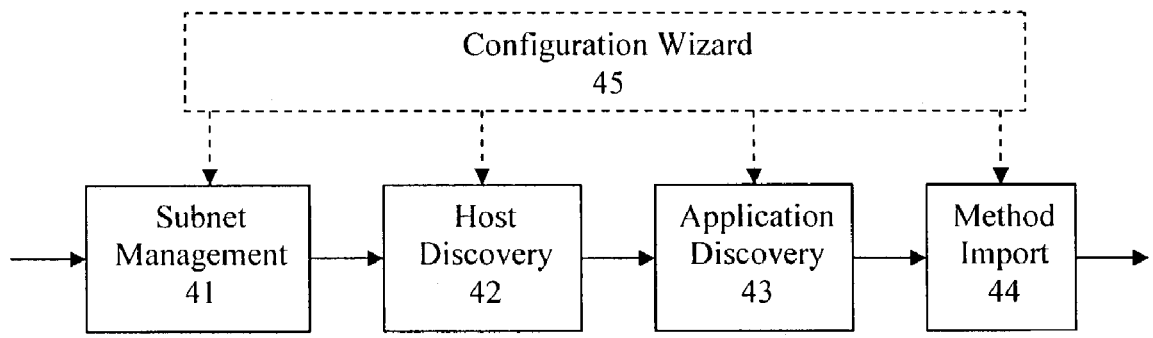
FIG. 4 shows a block diagram of an apparatus, according to one embodiment, for enterprise management.

An enterprise management tool 40, according to one embodiment (FIG. 4), may include the following components: subnet management 41; host discovery 42; application discovery 43; and method import engine 44. The components are a collection of subsystems that can optionally be used independently from one another, but also may be invoked through a configuration wizard 45 which ties them together.

Figure 5:
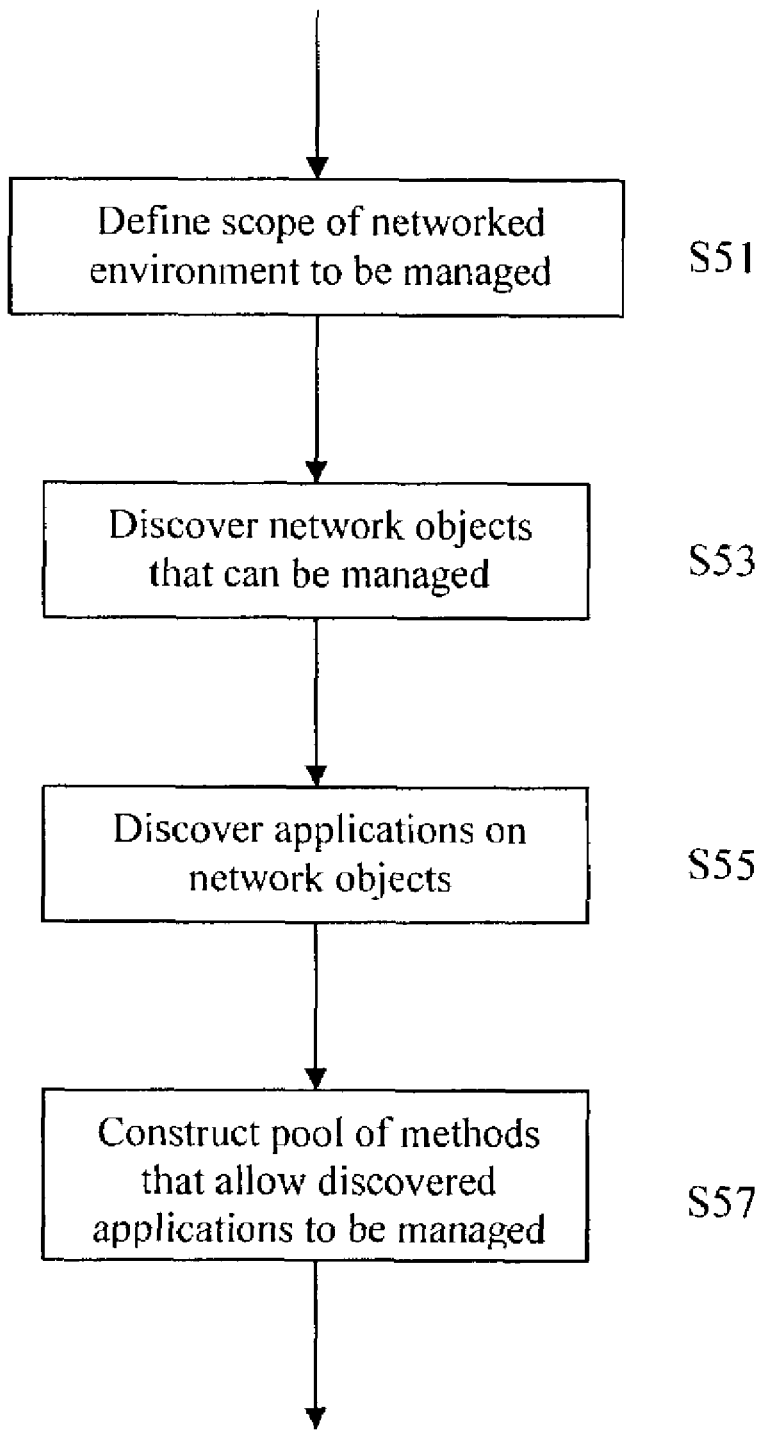
FIG. 5 shows a flow chart of a method for enterprise management, according to one embodiment.
Figure 6:
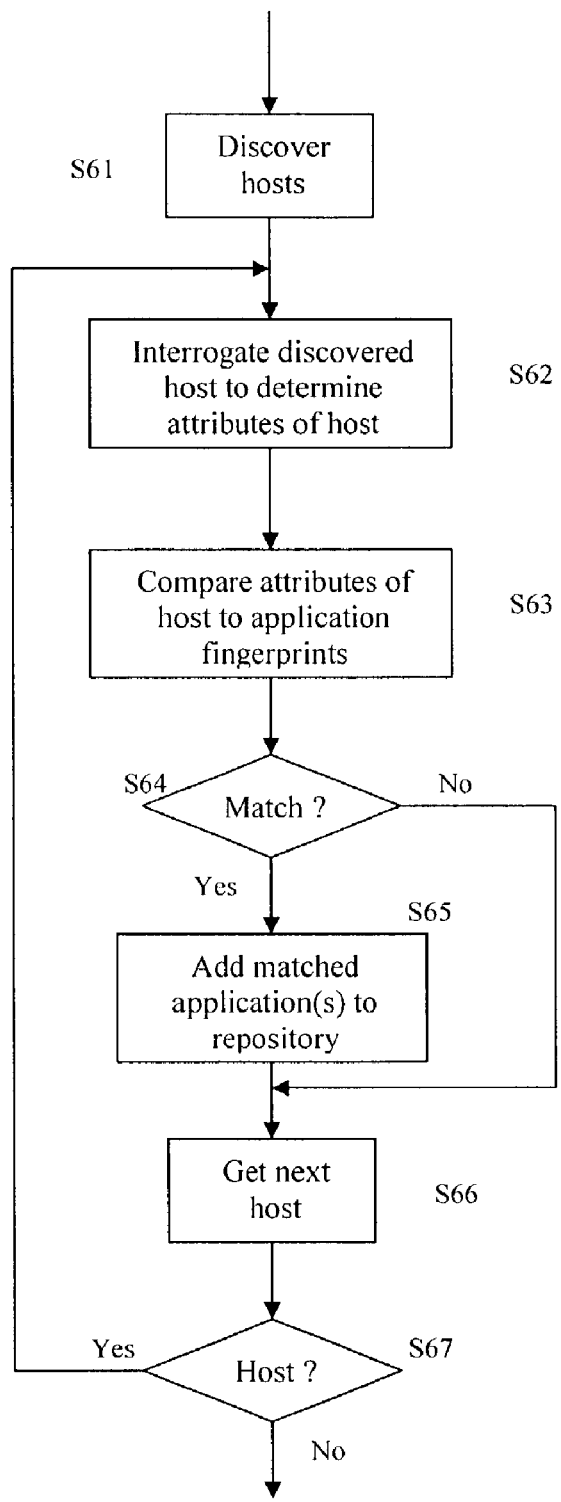
FIG. 6 shows a flow chart of an application discovery process, according to another embodiment.

The configuration wizard 45 may optionally be provided to guide a user through the remote discovery process. For example, the process which is performed under guidance of the configuration wizard, in order to discover (and make accessible to the user) software applications in the networked environment, may include, according to one embodiment (FIG. 5), defining through the subnet management component a scope of the network which is to be managed (step S51), discovering through the host discovery component host machines (as well as other hardware) in the network (step S53), discovering through the application discovery component software applications on a selected host machine (discovered in step S53 or otherwise) which are manageable (step S55), and constructing a user interface and a pool of methods which allow a user to manage the discovered applications (step S57).

The subnet management component 41 provides the user with a front end interface for specifying the scope of the networked environment, such as by selecting for example, the subnets which are to be subject to host discovery. The interface is preferably easy to understand and easy to use. For example, the interface may be a Java servlet (for example, a program that runs on a server).

Figure 7:
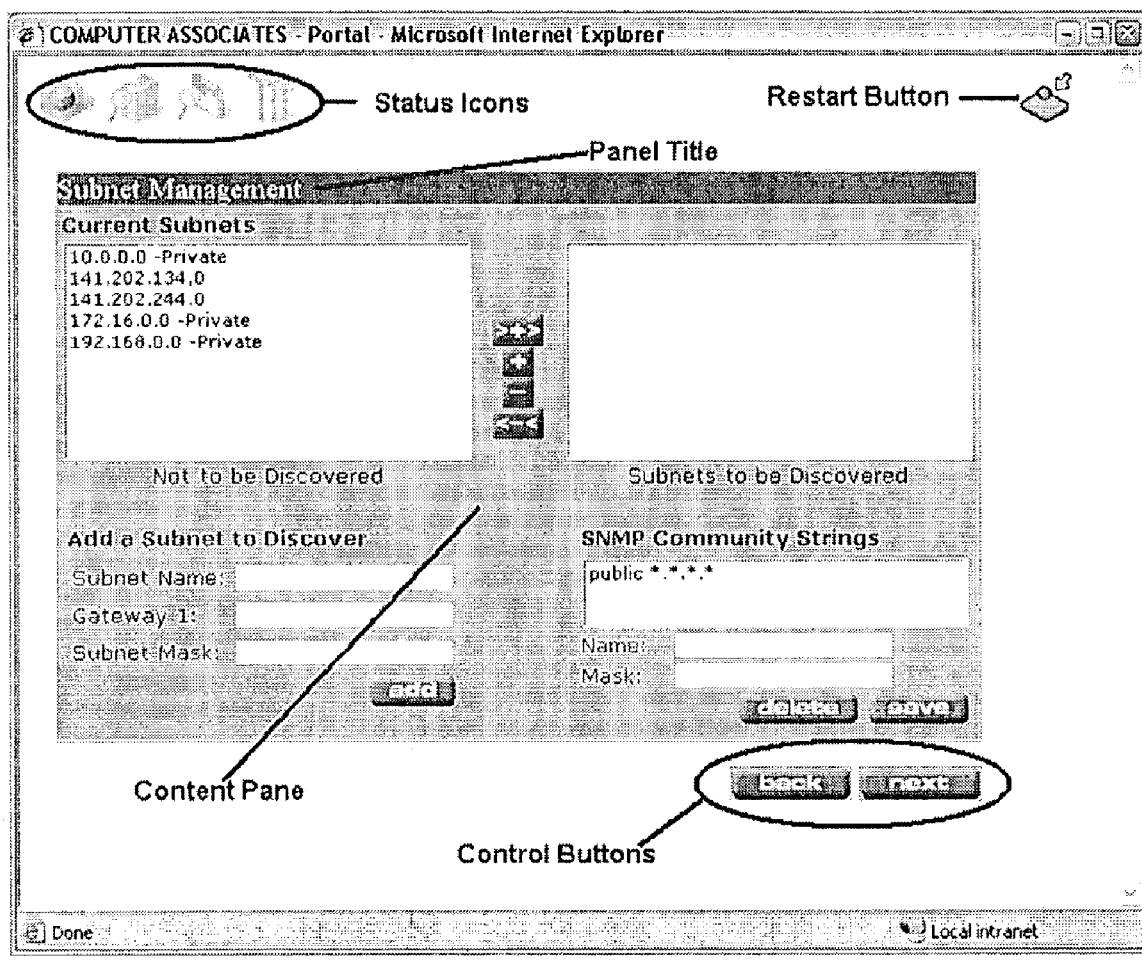
FIG. 7 shows a snap shot view of an exemplary servlet pane which may be presented by a subnet management component.

An exemplary subnet management pane which users may use to identify the subnets to be probed is shown in FIG. 7. The subnet management component may provide, for example, means for specifying network information, such as subnet name, subnet address, subnet mask, logical name, SNMP (Simple Network Management Protocol) mask, SNMP community string, etc.

Once the network information is entered, the information may be stored in, for example, a common object repository (COR). The host discovery module 42 uses this information to conduct discovery of hosts within the specified subnets.

The list of subnets provided by the subnet management component 41 is a starting point for host discovery 42. The host discovery component 42 scans the subnets for machines that are attached to the network. Data objects identifying respective host machines that are found by host discovery may be recorded in the common object repository.

According to one embodiment, host discovery reads network information (such as subnet address, subnet mask, subnet name, SNMP mask and SNMP community string) previously inserted into the common object repository by subnet management, scans the identified subnets in the network, and after scanning of machines within one subnet is completed, looks for hosts in other specified subnets to be discovered.

Figure 8A:
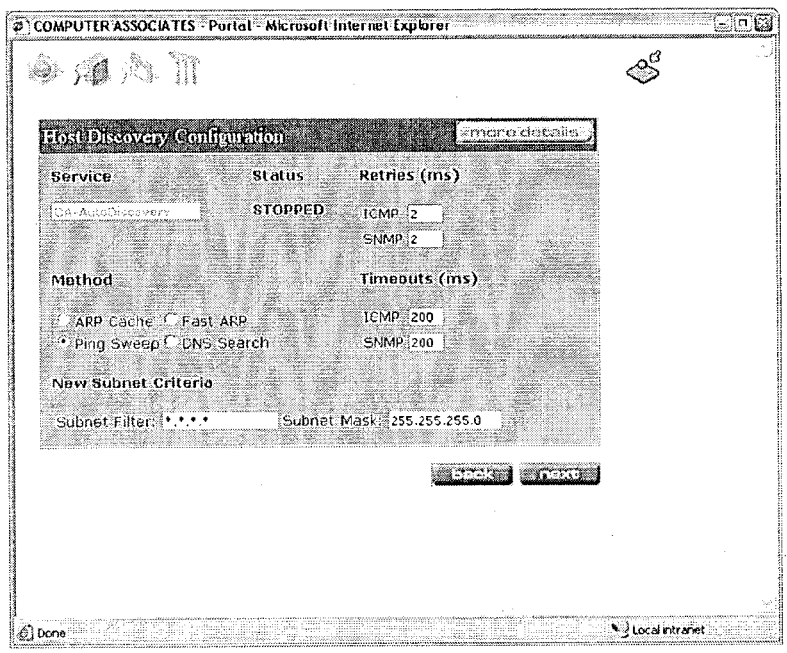
FIGS. 8A and 8B show snapshot views of an exemplary host discovery configuration interface.
Figure 8B:
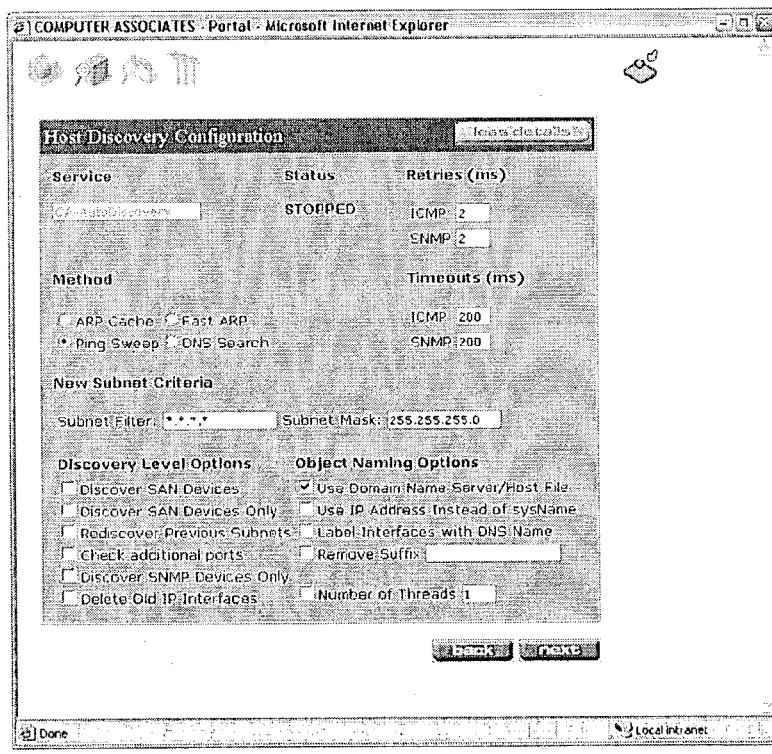
Figure 8C:
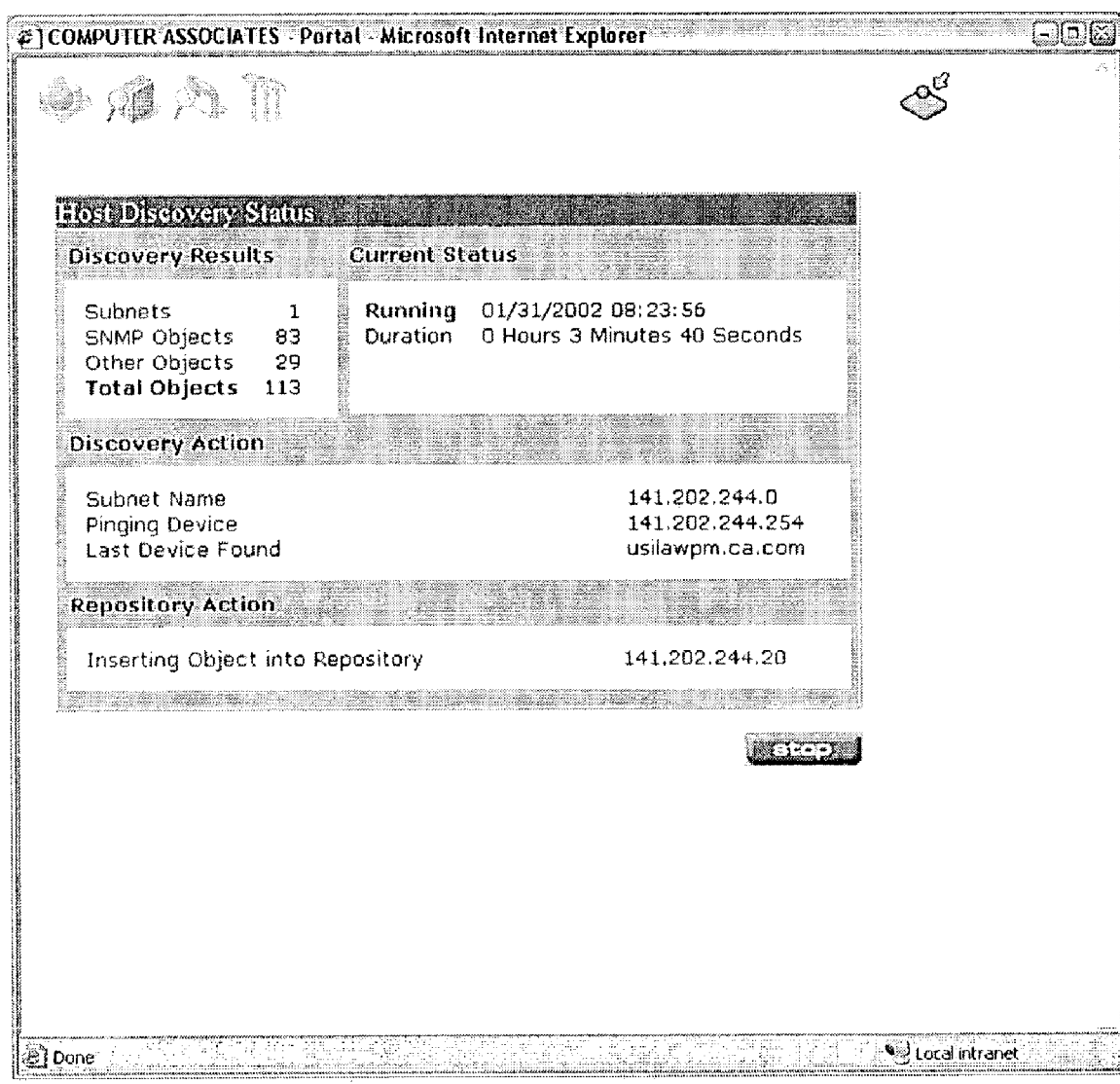
FIG. 8C shows a snapshot view of an exemplary host discovery status monitor.

A host discovery wizard (such as shown exemplarily in FIGS. 8A and 8B) may optionally be provided for configuring the host discovery process. The host discovery setup process may include the following: selection and de-selection of options presented in the host discovery interface (see, for example, FIG. 8B); selection of discovery method; and selection of subnet mask to further define the scope of discovery with respect to those subnets already defined. Thus, the scope of scanning by host discovery may be defined by the list of subnets specified in subnet management or it may be further modified during-host discovery setup. In any event, when host discovery is initiated, a host discovery monitor may be automatically displayed, such as exemplarily shown in FIG. 8C.

One of a variety of scanning methods may be used. For example, host discovery may scan a subnet by pinging each machine in the subnet (shown in FIGS. 8A and 8B as "Ping Sweep" method).

The host discovery component 42 may interrogate hosts in the specified subnets to identify machines which are likely candidates to house storage applications. According to one embodiment, a query of the SNMP SysObjId is transmitted to each machine that responds to the pinging. If a machine responds with its SysObjId, the SysObjId is compared to a list of pre-defined SysObjIDs, and the machine is classified accordingly.

The host discovery tasks may include discovering one or more of the following: servers in the networked environment; storage assets that are directly attached to those servers; storage assets that are network attached; and storage area networks. The host discovery process may be used to determine autonomously host machines where storage and storage-related devices may be found.

A report of the hosts identified by the host discovery may be generated. Information in this report may include, but is not limited to, the following: host name; class name; IP address; subnet mask; and creation time. This report can be used to validate and verify the successful discovery of objects within the scanned subnets (information of which is stored by subnet management into the common object repository and then retrieved by host discovery).

The list of host machines discovered by the host discovery component 42 may be retrieved from the common object repository and used as a starting point for the application discovery component 43.

According to one embodiment, the discovered hosts are enumerated from the common object repository and remote probe operations are performed on the hosts, in order to determine applications which are present on the hosts. The set of applications that the application discovery component 43 probes for, and the tests that the application discovery component performs in order to determine whether an application is present, may be defined in an application fingerprints file.

Figure 9A:
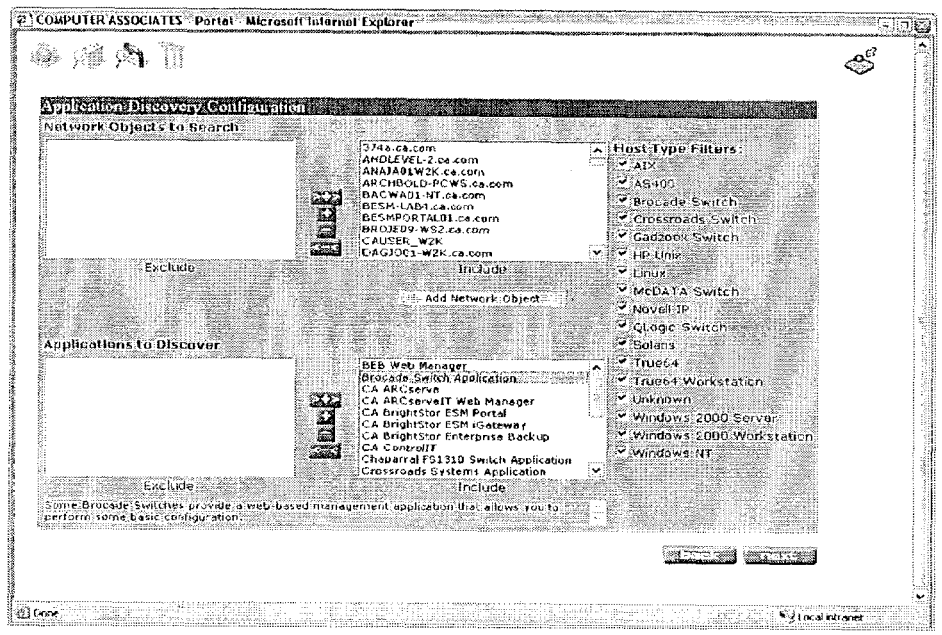
FIG. 9A shows a snapshot view of an exemplary application discovery configuration servlet.
Figure 9B:
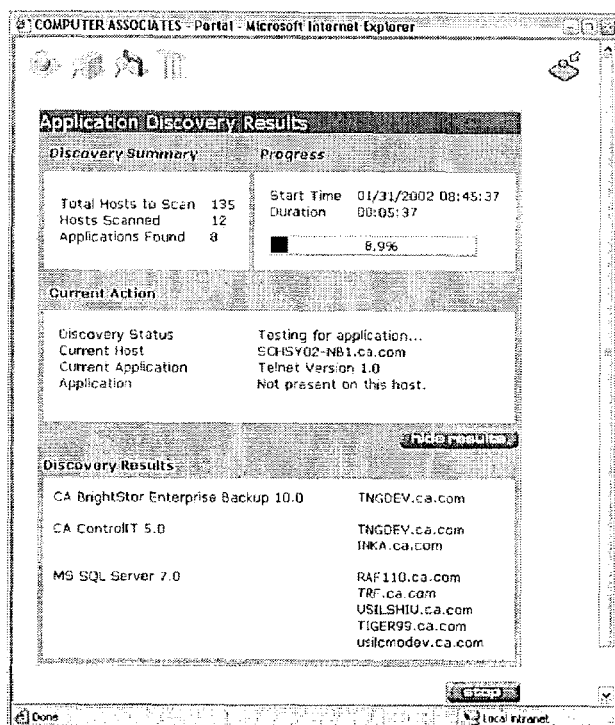
FIG. 9B shows a snapshot view of an exemplary application discovery status monitor.

According to another embodiment, when application discovery is triggered, the application discovery component 43 enumerates the hosts that are represented in the common object repository, enumerates the applications that it is capable of looking for (based on an application fingerprints file), and then opens an application discovery configuration servlet (see, for example, FIG. 9A). A set of pages may be provided for a portal administrator to customize the application discovery process. The application discovery setup process may include the following: selection and de-selection of host types; inclusion or exclusion of hosts to be interrogated; and inclusion or exclusion of applications to be searched for on the hosts. Using the configuration servlet, the user can decide the applications which should be looked for, and the machines on which to look for the selected applications. When user selection is completed, an application discovery monitor servlet (FIG. 9B) is displayed, and an autodiscovery process may be commenced.

The application discovery component searches the selected hosts for applications that are selected for inclusion. As the application discovery component is running, a status page (see, for example, FIG. 9B) may be displayed to post the latest information regarding the application discovery progress, including applications found.

Each selected machine may be probed according to the type of host that machine is and sets of criteria defined by the application fingerprints. An exemplary entry in an application fingerprint file is as follows:

```
<Fingerprint Version="0.1">
<Application_Name>CA BrightStor ESM Portal</Application_Name>
  <Description>The BrightStor Enterprise Storage Manager
  Portal</Description>
<Major_Version>1</Major_Version>
<Minor_Version>0</Minor_Version>
<Class_Name>CaiESMBrightStorESMApp</Class_Name>
<Test>
<Open_Port Number="8007" Type="TCP" />
<Open_Port Number="8080" Type="TCP" />
<URL_Test Protocol="http" Port="8080" File="/servlet/portal"
ResultString="BrightStor" />
</Test>
</Fingerprint>
```

According to another embodiment, application discovery may probe the machines to identify applications to which the portal is capable of interfacing. Any of the well-known probing methods, such as open port probe, SNMP query, http get, Telnet port probe, XML query, etc., may be used.

According to one embodiment (FIGS. 10A and 10B), the application discovery probe uses XML queries in combination with instrumentation technology (discussed below). Instrument Sponsors (iSponsors) and an Instrument Gateway (iGateway) are installed on each host with which the portal can interface. An iGateway is an agent that acts as a dispatcher for access to the iSponsors deployed on the host machine on which the iGateway is active. The iGateway listens for requests directed to the host, redirects a request to the appropriate iSponsor on the host machine, processes the response from the iSponsor, and redirects the response to the requester. iSponsors operate subordinate to the iGateway active on the machine and are agents which are associated with respective instruments (for example, applications, databases, network devices, etc.) on the machine. An iSponsor can extract information corresponding to the associated instrument, invoke commands, and invoke any service inherent to the instrument.

A host which has an active iGateway may be identified by probing the port used by the iGateway. When the host is further probed through an XML query formatted to invoke a Describe method of the iGateway, the iGateway enumerates the iSponsors that it has access to on the machine where the iGateway is executing. Each iSponsor in the list may then be sent an XML query requesting the iSponsor to describe itself and the application with which the iSponsor is associated. The information supplied by the iSponsor in response to the query can be used by the method import component to create a user interface through which a user can access content and manage enterprise resources (discussed below).

Figure 10A:
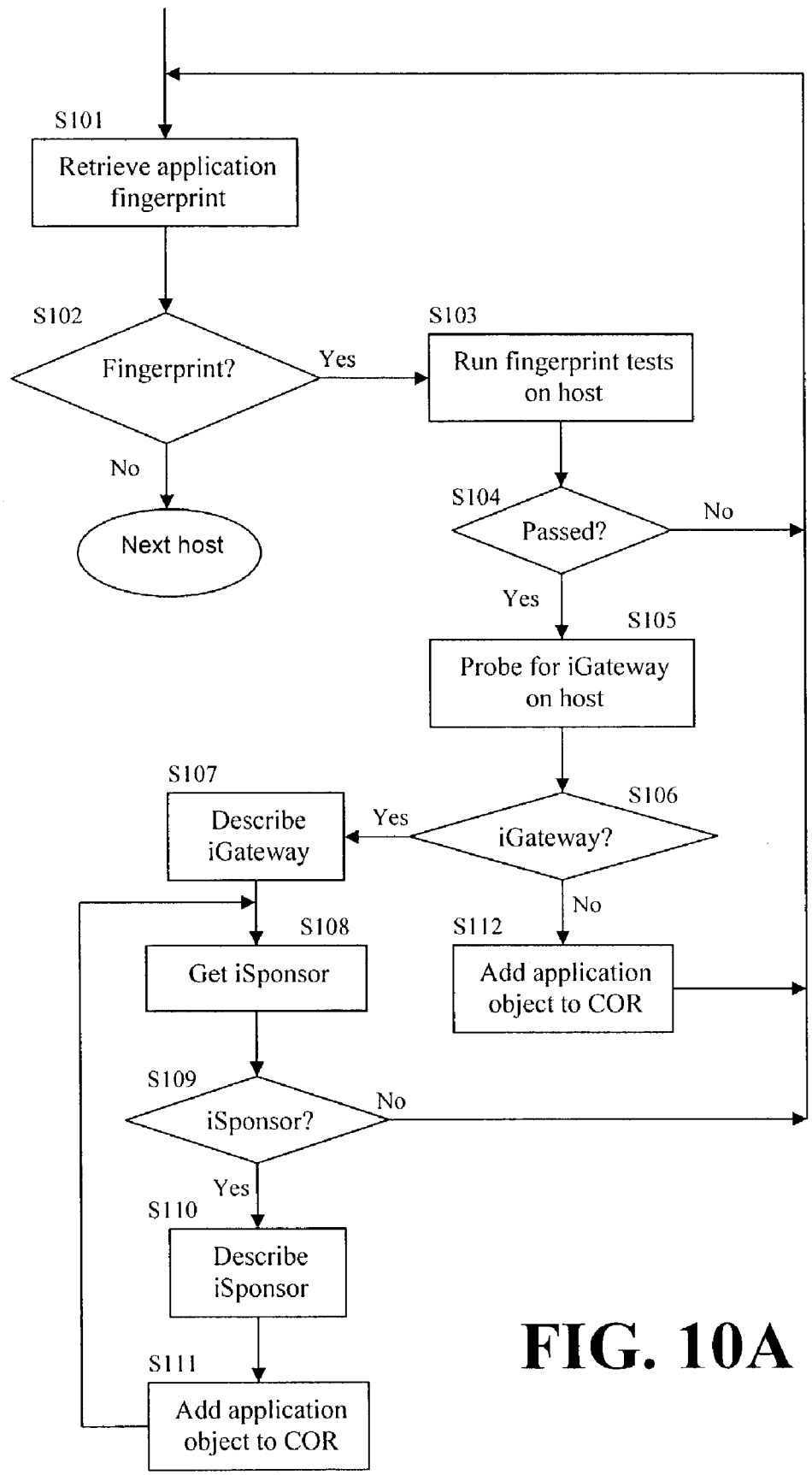
FIGS. 10A and 10B show flow charts for an autodiscovery process, according to one embodiment.

An autodiscovery process for discovering applications on a host with integrated instrumentation technology will be described with reference to FIGS. 10A and 10B. An application fingerprint is retrieved from the application fingerprints store (step S101). Next, the host is tested with the tests of the retrieved application fingerprint (step S103). If the host fails any of the tests of the retrieved application fingerprint (step S104, No), another application fingerprint is retrieved from the application fingerprints store (step S101). If the tests are passed (step S104, Yes), the host is probed for an iGateway (step S105). If no iGateway responds from the host (step S106, No), an application object corresponding to the application associated with the fingerprint is added to the COR (step S112), and the process tries another application fingerprint (step S101). If an iGateway responds from the host (step S106, Yes), the Describe method of the iGateway is invoked to obtain a list of the iSponsors on the host (step S107). An iSponsor entry on the list is retrieved (step S108), and the Describe method of the corresponding iSponsor is invoked to obtain information regarding the iSponsor and the associated application on the host (step S110). An application object is created for the application associated with the iSponsor, and is added to the COR (step S111). Next, another entry is retrieved from the list of iSponsors (step S108), and the process is repeated (steps S110 and S111). If there are no more entries on the list of iSponsors (step S109, No), the process returns to try another application fingerprint (step S101). If all fingerprints have been tested (step S102, No), the discovery shifts to the next host.

Figure 10B:
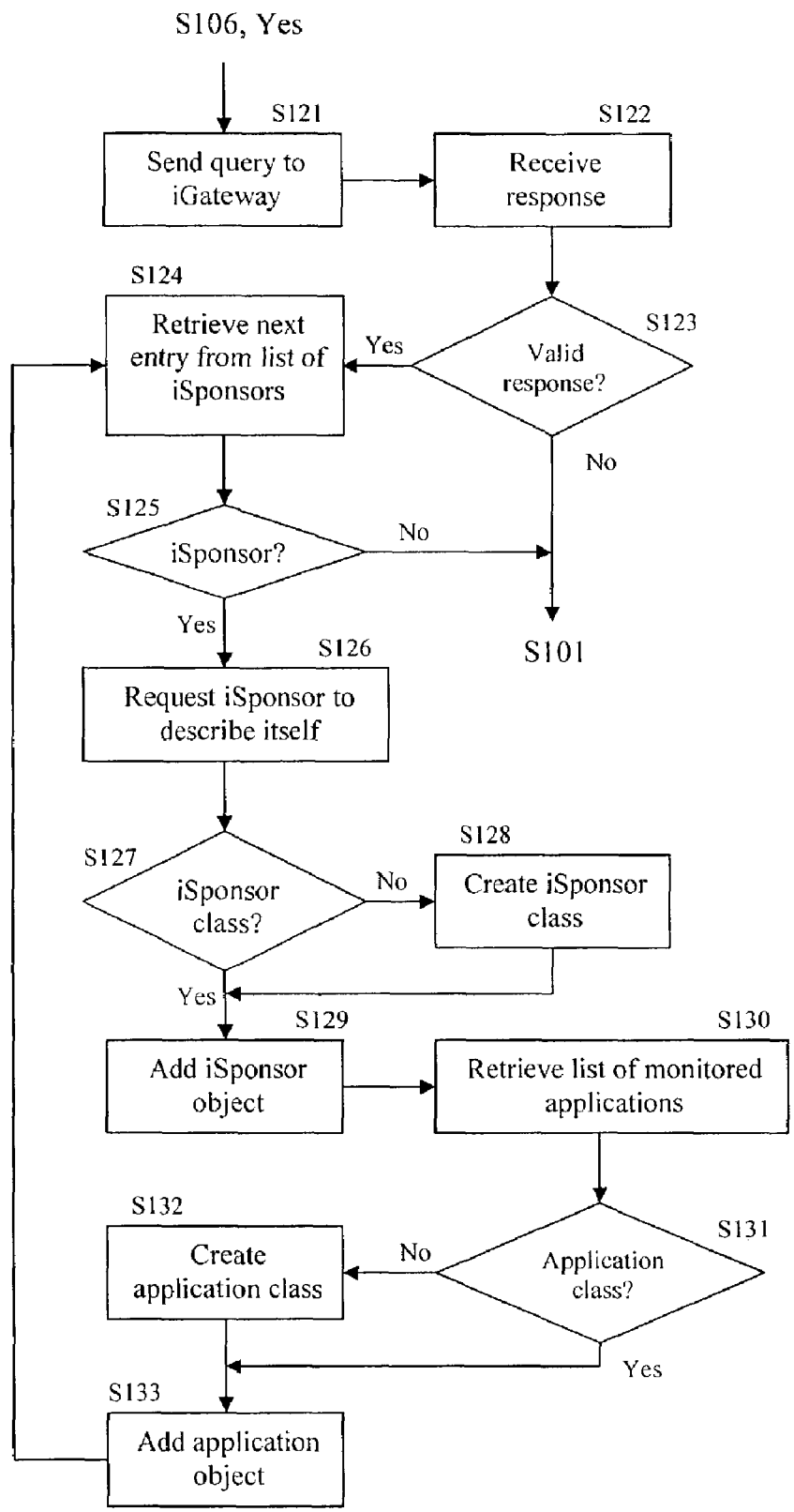

A summary of additional logic performed when looking for iSponsors is shown in FIG. 10B. If an iGateway responds from the host in response to probing by application discovery (step S106, Yes), an XML query is formulated and posed to the iGateway (step S121). If a response received from the iGateway (step S122) is not valid (step S123, No), the process returns to try another application fingerprint (step S101). If the response includes a list of iSponsors and is otherwise valid (step S123, Yes), an entry from the list of iSponsors is retrieved (step S124), and the Describe method of the iSponsor corresponding to the retrieved entry is invoked (step S120) in order to obtain information regarding the iSponsor and the corresponding application. If no data object representing the iSponsor class to which the iSponsor belongs is found in the COR (step S127, No), a data object is created for the iSponsor class and added to the COR (step S128). In any event, a data object corresponding to the iSponsor is added to the COR (step S129). Next, the list of monitored applications is retrieved from the COR (step S130). If the list does not have an application class to which the application associated with the iSponsor would belong (step S131, No), the application class is created and added to the list (step S132). In any event, a data object corresponding to the application associated with the iSponsor is added to the COR and associated with the application class (step S133). Next, the process returns to retrieve another entry from the list of iSponsors (step S124), and the process is repeated.

As applications are discovered on a searched host, a data object identifying the discovered application is generated, inserted into the common object repository, and associated with the host on which the application was found. In order to minimize redundancy, a data object representing a software application optionally may be associated with multiple installations of the application in the networked environment. After application discovery is complete, the common object repository is filled with data objects representing applications found by application discovery.

After application discovery is completed, a report of the discovered applications may be generated. This report may include the following information: application name; host name; creation; date; etc.

The method import component creates methods, menu items, knowledge tree items, etc., for the user interface, from which users of the portal can select. For example, the method import component uses a configuration file and the host and applications data placed in the common object repository by the host discovery and application discovery components, to determine menu items corresponding to the discovered applications to be added to a management console. The objective is to provide a easy-to-use and easy-to-understand user interface for the storage management tool which users can use to select content.

Method import uses the results of the host discovery and application discovery processes to populate a knowledge tree (which is used to create menu items). Method import updates the knowledge tree to include the following: (1) enumerate the hosts discovered by host discovery; and (2) enumerate the applications discovered by application discovery.

Figure 11:
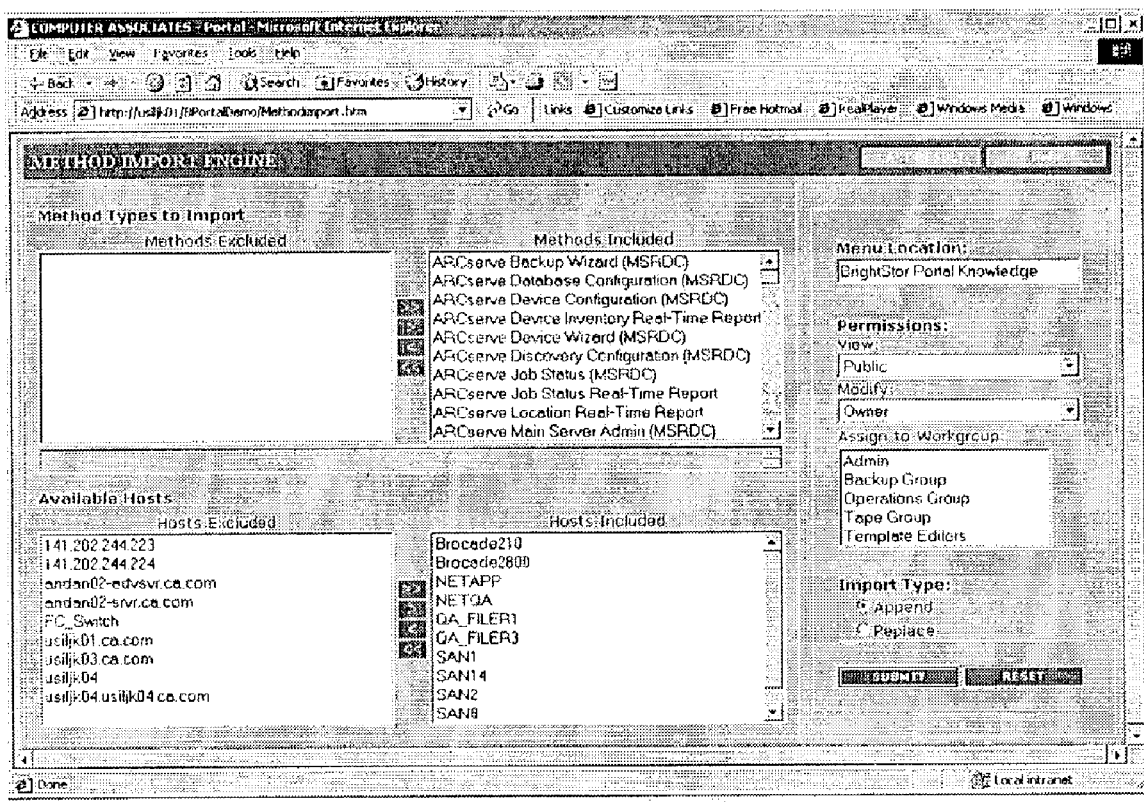
FIG. 11 shows a snapshot view of an exemplary method import configuration interface.

Using a configuration interface (see, for example, FIG. 11) the user can decide the hosts and the applications which should be processed by the method import engine.

The method import component may create a management console from which a storage administrator can perform a large percentage of their job, with access to the facilities necessary to set specifications, implement policy, monitor status, have access to storage growth and trend reporting applications, have access to storage resource management tools, etc.

The management console may provide a set of portlets (i.e., windows through which content is provided), which represent high-level, (and in some cases) joined views over the operation and monitoring of storage activities, in the enterprise, with drill down capabilities to specific applications, in context.

The management console preferably provides asset management capabilities through which a storage administrator can perform, for example, the following operations: obtain information regarding selected storage devices and software applications, including location, model, type, release level, maintenance level, etc.; obtain information regarding current configuration settings for storage devices and software applications; administer those configuration settings; and access incident/problem report information related to storage devices and software applications. The console may include a Launcher component which allows remote control (for example, launch in context) of applications on a remote machine. The administrator may be provided with means to customize content, such as the following: defining criteria which, when triggered, would raise an alert condition which is made visible in the portal; defining applications to which a given portal user will/should have access, and applications to which they should not have access; and specifying access credentials that the storage management portal runtime components should use when they invoke backend systems which serve as the instrumentation layer for performing the actual processing of the request. Mechanisms for securing access to the software applications invoked through the portal (either visibly or otherwise) may vary based on the interface requirements of the backend application being invoked.

One or more portlets may be provided to allow the administrator to access backup information and functionalities. A function to interrogate the last backup time and date of a specified device may be provided. If the specified backup time and date exceeds the specified time and date for a warning or critical notification, the respective warning or critical error may be displayed graphically. A set of files/filesystems that have certain backup criteria (daily, weekly, etc.) may be identified, and then the server may be queried to obtain information about when these files/filesystems were last backed up. If a file system or a group of files has not been backed up, it may be listed in a backup policy exception report.

The console may include mechanisms that can be used to manage, for example, enterprise backup server instances from a single place. Thus, an administrator can manage the entire set of enterprise backup instances all at once through the portal. Data may be collected from enterprise backup logs and access to this data may be provided through the portal. The administrator may be provided with the ability from the portal, to see the status of enterprise backup servers. A high level view of the overall status of the enterprise backup server is provided, with the ability to drill down to see job status and device status. Facilities may be provided for defining and reviewing enterprise backup administrative servers and policies so that administrators do not have to administer enterprise backup servers individually.

Software delivery capabilities may be provided through which an administrator can schedule or initiate delivery of software updates to storage devices (typically firmware updates) and to storage related software products.

The above specific embodiments are illustrative, and many variations can be introduced on these embodiments without departing from the spirit of the disclosure or from the scope of the appended claims.

For example, agents, web methods, or other similar functionality also may be integrated in the tools described in this disclosure to provide a user with information about installed applications. As another example, a program may be run on a local machine to take an inventory of all locally installed programs, and then report the results to a central server that compiles the information.

In addition, multi-threading may be used in host discovery (for example, scanning subnets) and in application discovery (for example, probing hosts) to perform tasks in parallel.

Elements and/or features of different illustrative embodiments may be combined with each other and/or substituted for each other within the scope of this disclosure and appended claims.

What is claimed is:

1. A method for discovering software applications in a networked environment, comprising:
 (a) retrieving an application fingerprint;
 (b) scanning a host machine in the networked environment for attributes that match the retrieved application fingerprint, each attribute indicating an effect caused by the host machine executing a software application; and (c) determining an identity of the software application on the host machine in response to matching the attributes of the host machine with the retrieved application fingerprint.

2. The method of claim 1 further comprising performing one or more tests to determine the attributes of the host machine.

3. The method of claim 1, further comprising providing a user interface, wherein the user interface provides a user with means to select the software application and means to launch the selected software application.

4. The method of claim 1 further comprising providing a report listing the identity of the software application.

5. The method of claim 1 further comprising probing the networked environment to identify a plurality of target host machines in the networked environment, and applying (a) and (b) to each identified target host machine to identify the software application on any of the target host machines.

6. The method of claim 1, wherein the software application is identified without user intervention.

7. The method of claim 1, wherein the application fingerprint comprises a pattern of relics produced by a model software application, and wherein matching the attributes of the host machine with the retrieved application fingerprint comprises matching the attributes of the host machine with the pattern of relics.

8. A computer system, comprising:
a processor; and
a program storage device readable by the computer system, tangibly embodying a program of instructions executable by the processor to:
retrieve an application fingerprint;
scan a host machine in the networked environment for attributes that match the retrieved application fingerprint, each aifribute indicating an effect caused by the host machine executing a software application; and
determine an identity of the software application on the host machine in response to matching the attributes of the host machine with the retrieved application fingerprint.

9. A program storage device readable by a machine, tangibly embodying a program of instructions executable by the machine to:
retrieve an application fingerprint;
scan a host machine in the networked environment for attributes that match the retrieved application fingerprint, each attribute indicating an effect caused by the host machine executing a software application; and
determine an identity of the software application on the host machine in response to matching the attributes of the host machine with the retrieved application fingerprint.

10. Logic for discovering software applications in a networked environment, the logic being embodied in a computer-readable medium and when executed operable to:
retrieve an application fingerprint;
scan a host machine in the networked environment for attributes that match the retrieved application fingerprint, each attribute indicating an effect caused by the host machine executing a software application; and
determine an identity of the software application on the host machine in response to matching the attributes of the host machine with the retrieved application fingerprint.

11. A method for discovering software applications in a networked environment, comprising:
(a) probing a host machine in the networked environment to determine attributes of the machine, each attribute indicating an effect caused by the host machine executing one of a plurality of software applications;
(b) comparing the attributes of the host machine to an application fingerprint; and
(c) determining an identity of at least one of the plurality of software applications on the machine in response to matching one or more of the attributes of the host machine with the retrieved application fingerprint.

12. An apparatus for discovering software application in a networked environment having a plurality of host machines, the apparatus comprising:
an fingerprints store for storing a plurality of application fingerprints; and
an discovery engine including means for retrieving the fingerprints from the fingerprints store, means for probing a selected, remote host machine in the networked environment to determine attributes of the machine, each attribute indicating an effect caused by the host machine executing one of a plurality of software applications, means for comparing the attributes of the remote machine to the retrieved fingerprints; and means for determining an identity of one or more of the plurality of software applications on the machine in response to matching the attributes of the remote machine with the retrieved fingerprint.

13. The apparatus of claim 12 further comprising a management console, wherein the management console provides a user with means for managing the discovered software applications.

14. The apparatus of claim 13, wherein the management console includes means for launching selected ones of the discovered software applications.

15. The apparatus of claim 13, wherein the management console includes means for monitoring selected ones of the discovered software applications.

16. The apparatus of claim 13, wherein the management console includes means for defining a condition for triggering an alert on the management console, relating to a selected one of the discovered software applications.

17. The apparatus of claim 13, wherein the management console includes means for initiating backup of files through selected ones of the discovered software applications.

18. The apparatus of claim 13, wherein the management console includes means for querying a selected one of the software applications to determine when files for the software application were last backed up.

19. The apparatus of claim 13, wherein the management console includes means for managing access rights for selected ones of the discovered software applications.

20. The apparatus of claim 13 further comprising a subnet management component through which a user defines bounds for the networked environment.

21. The apparatus of claim 20, wherein the bounds of the networked environment are defined by excluding selected host machines.

22. The apparatus of claim 20, wherein the bounds of the networked environment are defined by including selected host machines.

23. The apparatus of claim 12, wherein the application fingerprint comprises a pattern of relics produced by a model software application, and wherein the application discovery engine further includes means for matching the attributes of the host machine with the pattern of relics.

24. An apparatus for managing software applications in a networked environment, comprising:
- a host discovery component, the host discovery component scanning the networked environment to identify host machines in the networked environment;
- an application discovery component, the application discovery component probing each host machine identified by the host discovery component to determine attributes of the host machine, each attribute indicating an effect caused by the host machine executing a software application, comparing the attributes of the host machine to one or more application fingerprints, and discovering the software application deployed on the host machine in response to matching the attributes of the host machine with the one or more application fingerprints; and
- a management console, wherein the management console includes means for managing the software applications discovered by the application discovery component in the networked environment.

25. The apparatus claimed in claim 24, wherein the application discovery component probes a host machine in the networked environment to determine attributes of the machine, and compares the attributes of the host machine to one or more application fingerprints to determine an identity of software applications on the machine.

26. The apparatus claimed in claim 24 further comprising a subnet management component, wherein the subnet management component provides means for a user to define a scope of the networked environment which is managed.

27. The apparatus claimed in claim 24 further comprising a method import component for adding means to the management console for managing a discovered software application.

28. The apparatus of claim 24, wherein the application fingerprint comprises a pattern of relics produced by a model software application, and wherein the application discovery component is operable to discover the software application deployed on the host machine in response to matching the attributes of the host machine with the pattern of relics.

* * * * *